(12) United States Patent
Quantmeyer et al.

(10) Patent No.: US 11,451,073 B2
(45) Date of Patent: Sep. 20, 2022

(54) CONTROL ARRANGEMENT FOR A HIGH-VOLTAGE BATTERY AND METHOD FOR OPERATING SUCH A CONTROL ARRANGEMENT

(71) Applicant: VOLKSWAGEN AKTIENGESELLSCHAFT, Wolfsburg (DE)

(72) Inventors: Florian Quantmeyer, Wolfenbüttel (DE); Florian Kühnlenz, Barwedel (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 17/083,739

(22) Filed: Oct. 29, 2020

(65) Prior Publication Data
US 2021/0126472 A1    Apr. 29, 2021

(30) Foreign Application Priority Data

Oct. 29, 2019   (DE) .................... 10 2019 129 170.4

(51) Int. Cl.
*H02J 7/00*    (2006.01)
*B60R 16/033*   (2006.01)

(52) U.S. Cl.
CPC .......... *H02J 7/0031* (2013.01); *B60R 16/033* (2013.01); *H02J 7/0048* (2020.01); *H02J 7/0063* (2013.01)

(58) Field of Classification Search
CPC .... H02J 7/0063; H02J 2207/10; H02J 7/0048; H02J 7/0031; H02J 7/00306; Y02T 10/70; B60R 16/033
See application file for complete search history.

(56) References Cited

U.S. PATENT DOCUMENTS

2004/0164703 A1   8/2004   Berels
2011/0202220 A1   8/2011   Seta et al.
(Continued)

FOREIGN PATENT DOCUMENTS

DE   10 2004 008 817 A1   10/2004
DE   10 2011 000 625 A1    2/2012
(Continued)

OTHER PUBLICATIONS

Search report for German Patent Application No. 10 2019 129 170.4, dated Aug. 3, 2020.

*Primary Examiner* — Jared Fureman
*Assistant Examiner* — Duc M Pham
(74) *Attorney, Agent, or Firm* — Pearl Cohen Zedek Latzer Baratz LLP

(57) ABSTRACT

A control arrangement for a high-voltage battery in a motor vehicle, encompasses at least a high-voltage battery having an electric first connection in order to provide a first supply voltage for a motor vehicle as well as a control unit for the high-voltage battery which, in the control arrangement of the motor vehicle, is connected exclusively to the high-voltage battery via an electric second connection in order to provide a second supply voltage for the control unit, whereby the second connection comprises a switching element that can be switched by the control unit in order to establish and disconnect the second connection. Moreover, a method for operating a control arrangement for a high-voltage battery in a motor vehicle is also described.

10 Claims, 1 Drawing Sheet

(56) References Cited

U.S. PATENT DOCUMENTS

2015/0377979 A1   12/2015  Barth et al.
2017/0155266 A1    6/2017  Namou et al.
2019/0176729 A1*  6/2019  Link ....................... B60L 58/19

FOREIGN PATENT DOCUMENTS

| | | |
|---|---|---|
| DE | 10 2013 002 589 A1 | 8/2014 |
| DE | 10 2013 204 532 A1 | 9/2014 |
| DE | 10 2016 122 924 A1 | 6/2017 |
| DE | 102016122924 A1 * | 6/2017 .......... H02J 7/00714 |
| WO | WO 2019/120735 A1 | 6/2019 |

* cited by examiner

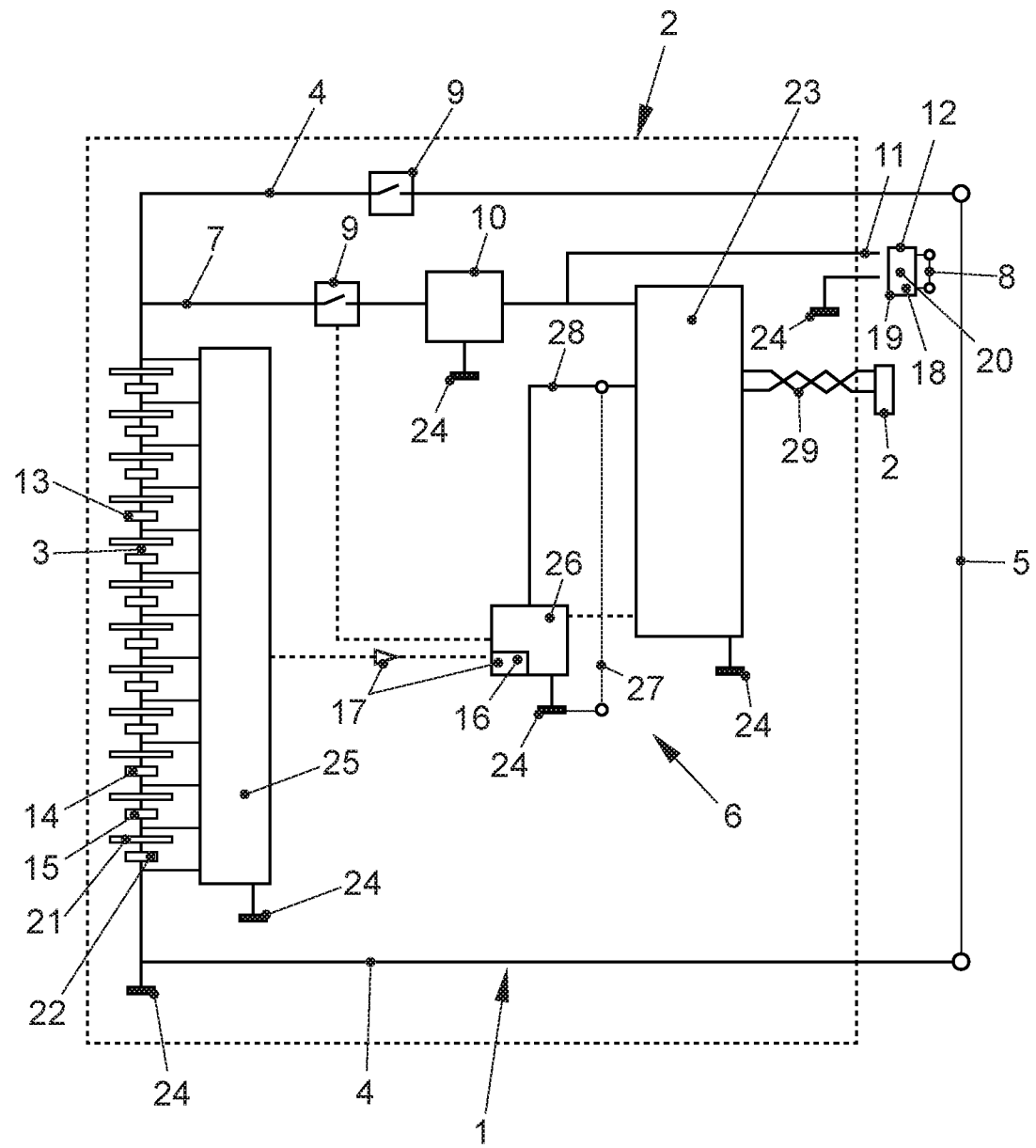

CONTROL ARRANGEMENT FOR A HIGH-VOLTAGE BATTERY AND METHOD FOR OPERATING SUCH A CONTROL ARRANGEMENT

CROSS REFERENCE TO RELATED APPLICATION

This application claims priority from German Patent Application No. 10 2019 129 170.4, filed Oct. 29, 2019, which is incorporated herein in its entirety.

FIELD OF THE INVENTION

The invention relates to a control arrangement for a high-voltage battery and to a method for operating such a control arrangement for a high-voltage battery. The control arrangement and the high-voltage battery are especially intended for use in a motor vehicle and are preferably installed in it.

BACKGROUND OF THE INVENTION

A high-voltage battery in a motor vehicle with, for example, a 48-V supply voltage, especially comprises a control unit (a battery management system—BMS) that draws its power from the 48-V supply voltage, that is to say, the BMS is supplied from the battery cells of the high-voltage battery itself. The closed-circuit current consumption of the BMS is very low so that even prolonged standing phases are usually not problematic. However, if a defined period of time is exceeded or if there is an error in the 48-V system, the high-voltage battery can become discharged.

If the electric voltage of the high-voltage battery falls below a defined limit value, the battery cells are irreversibly damaged and the high-voltage battery becomes defective. If the electric voltage drops even further, the BMS can no longer be supplied with electric energy. In this case, communication with the motor vehicle is not possible, neither by means of vehicle-external service instruments (e.g. diagnostic testers) nor by means of a CAN (controller area network, a bus system).

This gives rise to several problems. On the one hand, the high-voltage battery becomes irreversibly damaged, resulting in high repair costs. On the other hand, a diagnosis of internal errors in the high-voltage battery that might also have caused the discharging cannot be carried out. It is not possible to differentiate between an exhaustive discharging of the high-voltage battery and a control unit defect (for instance, a defective controller or CAN transceiver). Since especially lithium-ion batteries have to be handled as hazardous goods, defined regulations apply to the handling of such components. Among others, the guidelines of the German Association of the Automotive Industry (VDA) specify a classification of energy storage media (batteries) in terms of their transportation and storage. A prerequisite for this, among other things, is that the state of the energy storage medium has to be determined, and communication is indispensable for this purpose. If the classification cannot be made, the energy storage medium has to be handled as being defective (critical) and special procedures have to be initiated (transportation in standard packaging is no longer possible, storage has to be in quarantine containers, etc.). This might lead to extra costs.

It is a known approach to make high-voltage batteries with insulation between the battery voltage and the voltage supply of the control unit (BMS). This is necessary for safety considerations (high-voltage level of the high-voltage battery). This technique is employed especially with all known 48-V batteries. Consequently, the BMS is supplied via a 12-V voltage supply in the motor vehicle. The above-mentioned problem does not occur here.

The costs for insulating the various supply voltages raise the individual costs of the high-voltage battery. Moreover, the energy supply is less reliable since, as a rule, a high-voltage contactor as well as the BMS are supplied via the 12-V voltage supply and not via the 48-V voltage supply of the high-voltage battery.

German patent application DE 10 2013 204 532 A1 discloses a battery cell unit comprising a battery cell and a monitoring means that serves to monitor the battery cell. The monitoring means is intended to prevent overloading of the battery cell.

German patent application DE 10 2011 000 625 A1 relates to a control unit for electric vehicles which regulates the electric current from a high-voltage battery and which operates a drive motor as well as auxiliary aggregates. The operation of the auxiliary aggregates has to be prioritized as a function of the remaining energy capacity of the battery.

German patent application DE 10 2013 002 589 A1 discloses a method for testing several energy storage media in a motor vehicle.

SUMMARY OF THE INVENTION

The objective of the present invention is to solve, at least partially, the problems cited in conjunction with the state of the art. In particular, a control arrangement for a high-voltage battery is to be put forward which, on the one hand, can ensure a high degree of reliability in terms of the power supply for a control unit of the control arrangement, and which, on the other hand, can reliably ascertain the status of the high-voltage battery. Moreover, a method for operating such a control arrangement is being put forward.

A control arrangement having the features as claimed as well as a method as claimed contribute to achieving these objectives. Advantageous refinements are the subject matter of the dependent claims. The features cited individually in the claims can be combined with each other in any technically feasible way and can be augmented by explanatory statements stemming from the description and/or by the details from the FIGURE, whereby additional embodiment variants of the invention are elaborated upon.

A control arrangement for a high-voltage battery is being put forward. The high-voltage battery is especially intended for use in a motor vehicle. The control arrangement encompasses at least

- a high-voltage battery having an electric first connection in order to provide a first supply voltage for a motor vehicle as well as
- a control unit for the high-voltage battery which, in the control arrangement of the motor vehicle, is connected exclusively to the high-voltage battery via an electric second connection in order to provide a second supply voltage for the control unit.

The second connection comprises a switching element that can be switched by the control unit in order to establish and disconnect the second connection.

The high-voltage battery is suitably configured to provide a first supply voltage of at least 30 volts, especially at least 40 volts, preferably at least 45 volts. In particular, the first supply voltage amounts to 48 volts.

The control unit is connected in the motor vehicle exclusively to the high-voltage battery in order to provide a second supply voltage. In particular, this means that the motor vehicle does not have an additional battery via which the control unit is supplied with a second supply voltage.

In particular, on the one hand, the high-voltage battery is connected to ground. The term "ground" refers to a conductive body to which, as a rule, the potential of zero is ascribed and which especially constitutes the reference potential for all signal voltages and operating voltages or supply voltages of the control arrangement.

On the other hand, the high-voltage battery can be connected to the motor vehicle via the first connection or else, if the control arrangement is installed in a motor vehicle, it is connected to this motor vehicle. Consumers of the motor vehicle are connected to the high-voltage battery via the first connection so as to be electrically conductive.

In particular, on the one hand, the control unit is connected to ground. On the other hand, the control unit is connected to the high-voltage battery via the second connection. The second connection can be disconnected by the control unit or, if applicable, re-established. For this purpose, especially a switching element, for example, a bistable relay, is provided by means of which the control unit can be actuated.

In its currentless state, a bistable relay can assume two different stable switching states.

In particular, the switching element can maintain the disconnection of the second connection, even in the absence of the supply voltage.

In particular, the second connection can only be disconnected or, if applicable, re-established, by the control unit.

In particular, the control unit is connected to the high-voltage battery via a voltage converter arranged in the second connection. In particular, the second supply voltage generated by the voltage converter is lower than the first supply voltage.

The voltage converter is especially situated between the high-voltage battery—in other words, for instance, the first connection—and the control unit. The switching element is especially situated between the first connection and the voltage converter.

In particular, the second supply voltage amounts to a maximum of 50% of the first supply voltage. In particular, the second supply voltage amounts to a maximum of 20 volts, preferably a maximum of 15 volts. The second supply voltage amounts to 12 volts.

Preferably, the second supply voltage amounts to a maximum of 10 volts, especially a maximum of or precisely 5 volts or 3.3 volts.

In particular, the control arrangement has a connector for connecting a vehicle-external service plug by means of which the control unit can be operated with the second supply voltage.

In particular, the service plug is not an integral part of the motor vehicle. In particular, the service plug is only plugged into the connector during maintenance or diagnostic work. In particular, the service plug is only plugged into the connector and a second supply voltage for the control unit is provided by a vehicle-external charger when the second connection is disconnected.

In particular, the control unit especially comprises a system basis chip. The control arrangement communicates with the motor vehicle especially via the system basis chip, for example, via a CAN. The system basis chip especially has an LDO (low dropout) regulator. LDO regulators especially can regulate an output voltage when the latter is very similar to an input voltage. A microcontroller of the control unit can be operated with a third supply voltage by means of the LDO regulator via a third connection.

The control unit especially comprises a microcontroller. The microcontroller can especially be operated with a third supply voltage. The third supply voltage especially amounts to a maximum of 50% of the second supply voltage, for instance, 3.3 volts or 5 volts.

The microcontroller is especially the core component of the control unit and it especially controls all of the sequences inside the control unit. In particular, the microcontroller is connected to an analog front-end via a communication channel. Especially the cell voltages as well as the pack voltage and the pack current of the high-voltage battery are detected via an analog front-ed.

An analog front-end is especially a circuit that serves to process and convert analog signals into digital signals. Particularly analog signals of the high-voltage battery are detected by the analog front-end and transmitted as digital signals to the microcontroller.

The switching element that switches the second connection can especially be actuated or activated via the microcontroller.

The control unit or the microcontroller can especially be used to continuously determine a momentary state of charge of the high-voltage battery during operation of the high-voltage battery. This determination or detection can be carried out on the basis of familiar methods such as, for example, open-circuit voltage measurement, current integration and/or complex cell models.

The control unit or the microcontroller especially makes it possible to detect when the state of charge has exceeded and/or fallen below its limit values.

In particular, if there has been a departure from the state of charge range prescribed for normal operation of the high-voltage battery (SOC—state-of-charge operating range), the control unit can transmit a warning to the motor vehicle, for instance, via a CAN. In addition or as an alternative, an error entry can be made in the control unit, especially in a non-volatile storage medium of the control unit.

Moreover, a method for operating a control arrangement for a high-voltage battery is being put forward. The high-voltage battery is especially intended for use in a motor vehicle. The method is especially carried out when the high-voltage battery is installed in the motor vehicle. The method particularly serves to operate the described control arrangement.

The control arrangement operated by the method comprises at least:
  a high-voltage battery having an electric first connection in order to provide a first supply voltage for a motor vehicle as well as
  a control unit for the high-voltage battery which, in the control arrangement of the motor vehicle, is connected exclusively to the high-voltage battery via an electric second connection in order to provide a second supply voltage for the control unit.

The second connection has a switching element that can be switched by the control unit in order to establish and disconnect the second connection.

The method comprises at least the following steps:
  a) determining a momentary state of charge of the high-voltage battery by means of the control unit; and
  (only if/not until) the momentary state of charge has fallen below a limit value:
  b) disconnecting the second connection.

The above-mentioned, non-definitive breakdown of the method steps into a) and b) is meant to serve primarily for differentiation purposes and does not prescribe any sequence and/or dependency relationship. The frequency of the method steps, for instance, during the set-up and/or operation of the system, can also vary. By the same token, it is possible for the method steps to overlap chronologically, at least in part. Especially preferably, method step a) takes place continuously. In particular, steps a) and b) are carried out in the sequence indicated.

In particular, the first connection has a switching element that can be switched by the control unit at least to disconnect the first connection. Prior to step b), especially the following steps are carried out:
  i. carrying out step a), and,
  (only if/not until) the momentary state of charge has fallen below a first limit value:
  ii. disconnecting the first connection, and
  iii. carrying out step a), and,
  (only if/not until) the momentary state of charge has fallen below a second limit value:
  iv. carrying out step b).

In particular, step a) is carried out continuously, at least until the execution of step b). In particular, steps i. to iv. are carried out in the sequence indicated.

In particular, the second limit value is lower than the first limit value. The method especially takes place while the state of charge of the high-voltage battery is being acquired.

The method is especially intended to protect the high-voltage battery.

In particular, according to step ii., the first connection is disconnected. This makes it possible to achieve that the first connection is interrupted between the high-voltage battery and the motor vehicle and especially the consumers installed in the motor vehicle, so that the high-voltage battery is not further discharged via the motor vehicle.

The first limit value especially amounts to between 10% and 20%, preferably 15%, of a rated state of charge, in other words, a rated charge capacity of the high-voltage battery. The usual operating range for the high-voltage battery when used in a motor vehicle encompasses especially a state of charge between 30% and 100% of a rated state of charge.

The second limit value especially amounts to less than 12%, preferably 10%, of a rated state of charge.

After step ii., the high-voltage battery especially is still only connected to the control unit. The control unit especially has a considerably lower energy demand than the motor vehicle. In particular, the motor vehicle is still connected to the control unit or it can still communicate with the control unit, for example, via a CAN.

If the state of charge falls below a second limit value, the second connection is likewise disconnected, that is to say, the control unit is also disconnected from the high-voltage battery. In this manner, after step b), especially no more consumers are connected to the high-voltage battery.

In particular, immediately before step b), a status signal is stored in a non-volatile storage medium of the control unit. By means of the status signal, the status of the high-voltage battery is stored in the control unit, so that this status can be read out of the control unit, for instance, via the service plug or via a vehicle-external service device. This allows an error diagnosis of the high-voltage battery to take place, even after complete discharging of and/or damage to the high-voltage battery.

In particular, the control arrangement has a connector for connecting a vehicle-external service plug via which the control unit can be operated with the second supply voltage.

After step b), the first connection is especially established via a control command transmitted via the service plug.

After step b), the first connection is especially established exclusively via the service plug and not only via the control unit or via the motor vehicle. This ensures that the high-voltage battery cannot be further discharged via consumers of the motor vehicle or of the control arrangement. In particular, only the high-voltage battery can discharge itself, a process in which the self-discharging is in the range of, for example, a maximum of 2% of the rated state of charge per month.

In particular, communication with a service device by means of which a control command to charge the high-voltage battery can be transmitted to the control unit takes place via the service plug. In other words, the first connection is especially established exclusively via a control command generated outside of the vehicle.

In particular, once the first connection has been established, the high-voltage battery is charged via a vehicle-external charger.

In particular, a momentary state of charge of the high-voltage battery is ascertained by a service device that is connected to the control unit via the service plug. If it is ascertained by means of the service device that the state of charge has fallen below a third limit value, the establishment of the first connection is prevented.

The service device is, for instance, a manufacturer-specific diagnostic device (e.g. ODIS, Diagra, etc.) or a standardized diagnostic device, e.g. UDS (Unified Diagnostic Services). UDS is a diagnostic communication protocol used in the realm of control units within automotive electronics, which is specified, for example, in ISO 14229.

A drop below the third limit value especially indicates that the high-voltage battery is at least partially damaged, conceivably irreversibly, as a result of which the establishment of the first connection is then prevented. The status signal that has already been stored in the control unit especially allows a diagnosis of the error in the high-voltage battery.

The third limit value amounts especially to a maximum of 0.5%, preferably 0%, of a rated state of charge.

In particular, after step b), the second connection is only re-established when the high-voltage battery has reached a state of charge that exceeds a fourth limit value. The second connection is especially re-established by the control unit.

The fourth limit value falls especially between the third limit value and the second limit value or between the second limit value and the first limit value.

In particular, the control unit of the control arrangement is configured, designed or programmed to carry out the described method.

Moreover, the method can also be executed by a computer or with a processor of a control unit.

Accordingly, a data processing system is also being put forward which comprises a processor that is adapted or configured in such a way that it executes the method or some of the steps of the proposed method.

A computer-readable storage medium can be provided that comprises commands which, during the execution by a computer or processor, cause them to execute the method or at least some of the steps of the proposed method.

The elaborations made about the method can especially be applied to the control arrangement or to the computer-implemented method (in other words, the computer or the processor, the data processing system, the computer-readable storage medium) and vice versa.

In particular, the high-voltage battery can also be operated autonomously (in other words, without the motor vehicle or without having been installed in a motor vehicle), whereby the high-voltage battery or the proposed control arrangement does not have any additional voltage supply or voltage source and/or no insulation between the supply voltage of the high-voltage battery and a supply voltage of the control unit.

The use of indefinite articles ("a", "an"), especially in the claims and in the description that explains the claims, are to be understood as such and not as numerals. Therefore, terms or components introduced with these should be construed in such a way that they are present at least once but can also be present multiple times.

For the sake of clarity, it should be pointed out that the ordinal numbers used here ("first", "second", etc.) serve primarily (only) to differentiate among several similar object, quantities or processes, in other words, they do not absolutely prescribe any relationship and/or sequence of these objects, quantities or processes with respect to each other. If a relationship and/or a sequence is required, this is then indicated explicitly here or else it is obvious to the person skilled in the art who studies the embodiment being concretely described. Insofar as a component can be present multiple times ("at least one"), the description of one of these components can apply equally to all or to some of the plurality of these components, although this does not absolutely have to be the case.

BRIEF DESCRIPTION OF THE DRAWINGS

The invention as well as the applicable technical field will be described in greater detail below on the basis of the accompanying FIGURE. It should be pointed out that the invention is not to be construed as being restricted to the embodiment presented. In particular, unless expressly indicated otherwise, it is also possible to extract partial aspects of the situations elucidated in the FIGURE and to combine them with other components and insights stemming from the present description. In particular, it should be pointed out that the FIGURE and especially the size relationships shown are purely of a schematic nature.

FIGURE shows a motor vehicle having a control arrangement.

DETAILED DESCRIPTION OF THE INVENTION

FIG. 1 shows a motor vehicle 2 having a control arrangement 1. The control arrangement 1 comprises a high-voltage battery 3 having an electric first connection 4 in order to provide a first supply voltage 5 for the motor vehicle 2 as well as a control unit 6 for the high-voltage battery 3. In the control arrangement 1 of the motor vehicle 2, the control unit 6 is connected exclusively to the high-voltage battery 3 via an electric second connection 7 in order to provide a second supply voltage 8 for the control unit 6. The second connection 7 has a switching element 9 that can be switched by the control unit 6 in order to establish and disconnect the second connection 7.

The control unit 6 is connected exclusively to the high-voltage battery 3 in the motor vehicle 2 in order to provide a second supply voltage 8. The control unit 6 is connected to the high-voltage battery 3 via a voltage converter 10 arranged in the second connection 7.

The high-voltage battery 3 is connected, on the one hand, to ground 24. On the other hand, the high-voltage battery 3 is connected to the motor vehicle 2 via the first connection 4. Consumers of the motor vehicle 2 are connected to the high-voltage battery 3 via the first connection 4 so as to be electrically conductive.

The control unit 6 is likewise connected to ground 24. On the other hand, the control unit 6 is connected to the high-voltage battery 3 via the second connection 7. The second connection 7 can be disconnected or, if applicable, re-established by a switching element 9 that is actuated by the control unit 6.

The control unit 6 especially comprises a system basis chip 23. The communication of the control arrangement 1 with the motor vehicle 2 especially takes place via the system basis chip 23, for example, via a CAN 29.

The control unit 6 especially comprises a microcontroller 26. The microcontroller 26 can especially be operated via the third connection 28 with a third supply voltage 27. The microcontroller 26 is connected to an analog front-end 25 via a communication channel. The cell voltages as well as the pack voltage and the pack current of the high-voltage battery 3 are detected via an analog front-end 25.

The switching element 9 that switches the second connection 7 can be actuated or activated via the microcontroller 26.

A momentary state of charge 13 of the high-voltage battery 3 can be continuously determined by means of the control unit 6 or by means of the microcontroller 26 during operation of the high-voltage battery 3. The control unit 6 or the microcontroller 26 can ascertain if the state of charge 13 has exceeded and/or fallen below a first limit value 14, a second limit value 15, a third limit value 21 or a fourth limit value 22.

The control arrangement 1 has a connector 11 for connecting a vehicle-external service plug 12 by means of which the control unit 6 can be operated with the second supply voltage 8. After step b) of the method, the first connection 4 is established by means of a control command 18 that is transmitted via the service plug 12.

According to step a) of the method, the control unit 6 determines a momentary state of charge 13 of the high-voltage battery 3. If it is ascertained that the momentary state of charge 13 of the high-voltage battery 3 has fallen below a first limit value 14, then, according to step ii., the first connection 4 is disconnected, that is to say, the consumers of the motor vehicle 2 are disconnected from the high-voltage battery 3. As a result, further discharging of the high-voltage battery 3 can at least be slowed down. At this point in time, the control unit 6 continues to draw the requisite second supply voltage 8 from the high-voltage battery 3 via the second connection 7. According to step iii., step a) is carried out anew or continues to be carried out, in other words, the momentary state of charge 13 of the high-voltage battery 3 is determined via the control unit 6. If it is ascertained that the momentary state of charge 13 of the high-voltage battery 3 has fallen below a second limit value 15, then, according to step iv., the second connection 7 is disconnected, that is to say, the control unit 6 is also disconnected from the high-voltage battery 3. Immediately before step b), in other words, before the second connection 7 is disconnected, a status signal 17 of the high-voltage battery 3 is stored in a non-volatile storage medium 16 of the control unit 6.

Since the second connection 7 is also disconnected, further discharging of the high-voltage battery 3 slows down. The high-voltage battery 3 now becomes further discharged exclusively due to self-discharging of the battery cells of the high-voltage battery 3, for instance, due to chemical processes.

The status signal 17 that has been placed or stored in the non-volatile storage medium 16 can be read out at a later point in time via the vehicle-external service plug 12. Consequently, the status of the high-voltage battery 3 can be ascertained, even if the high-voltage battery 3 has become completely discharged.

LIST OF REFERENCE NUMERALS 1 control arrangement
2 motor vehicle
3 high-voltage battery
4 first connection
5 first supply voltage
6 control unit
7 second connection
8 second supply voltage
9 switching element
10 voltage converter
11 connector
12 service plug
13 state of charge
14 first limit value
15 second limit value
16 storage medium
17 status signal
18 control command
19 charger
20 service device
21 third limit value
22 fourth limit value
23 system basis chip
24 ground
25 analog front-end
26 microcontroller
27 third supply voltage
28 third connection
29 CAN

The invention claimed is:

1. A control arrangement for a high-voltage battery in a motor vehicle, comprising:
   a high-voltage battery having an electric first connection in order to provide a first supply voltage for the motor vehicle, and
   a control unit for the high-voltage battery which, in the control arrangement of the motor vehicle, is connected exclusively to the high-voltage battery via an electric second connection in order to provide a second supply voltage for the control unit,
   whereby the second connection comprises a switching element that can be switched by the control unit in order to establish and disconnect the second connection.

2. The control arrangement according to claim 1, whereby the control unit is connected to the high-voltage battery via a voltage converter arranged in the second connection,
   whereby the second supply voltage generated by the voltage converter is lower than the first supply voltage.

3. The control arrangement according to claim 1, further comprising a connector for connecting a vehicle-external service plug and by which the control unit can be operated with the second supply voltage.

4. A method for operating a control arrangement for a high-voltage battery in a motor vehicle, whereby the control arrangement comprises at least a high-voltage battery having an electric first connection in order to provide a first supply voltage for the motor vehicle as well as a control unit for the high-voltage battery which, in the control arrangement of the motor vehicle, is connected exclusively to the high-voltage battery via an electric second connection in order to provide a second supply voltage for the control unit, whereby the second connection comprises a switching element that can be switched by the control unit in order to establish and disconnect the second connection, the method comprising the following steps:
   a) determining a momentary state of charge of the high-voltage battery by means of the control unit; and
   b) if the momentary state of charge has fallen below a limit value, disconnecting the second connection.

5. The method according to claim 4,
   whereby the first connection has a switching element that can be switched by the control unit (at least to disconnect the first connection;
   whereby, prior to step b), the following steps are carried out:
      i. carrying out step a), and,
      ii. only if/not until the momentary state of charge has fallen below a first limit value, disconnecting the first connection, and
      iii. carrying out step a), and,
      iv. only if/not until the momentary state of charge has fallen below a second limit value, carrying out step b).

6. The method according to claim 4, further comprising immediately before step b), storing a status signal in a non-volatile storage medium of the control unit.

7. The method according to claim 4,
   whereby the control arrangement has a connector for connecting a vehicle-external service plug via which the control unit can be operated with the second supply voltage,
   further comprising, after step b), establishing the first connection via a control command transmitted via the service plug.

8. The method according to claim 7, further comprising, once the first connection has been established, charging the high-voltage battery via a vehicle-external charger.

9. The method according to claim 7, further comprising:
   ascertaining a momentary state of charge of the high-voltage battery by a service device that is connected to the control unit via the service plug, and
   if it is ascertained by means of the service device that the state of charge has fallen below a third limit value, preventing the establishment of the first connection.

10. The method according to claim 4, whereby, after step b), the second connection is re-established only when the high-voltage battery has reached a state of charge that exceeds a fourth limit value.

* * * * *